United States Patent Office 3,733,240
Patented May 15, 1973

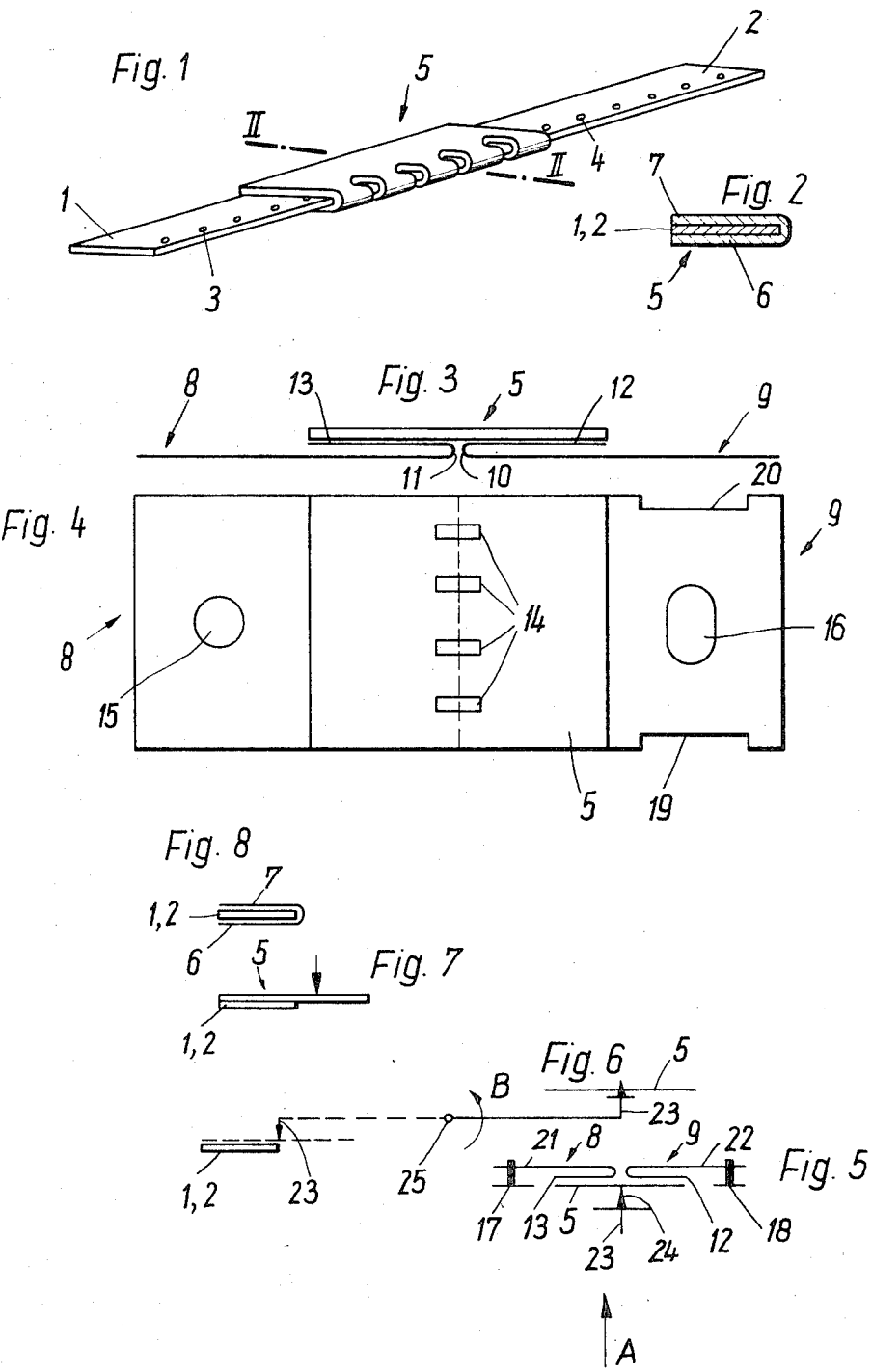

3,733,240
ADHESIVE SPLICING ELEMENT AND
METHOD OF SPLICING
Rudolf Hanke, Monheim, Schwaben, Germany, assignor to Hama Hamaphot, K.G., Hanke & Thomas, Monheim, Schwaben, Germany
Filed Apr. 12, 1971, Ser. No. 133,263
Claims priority, application Germany, May 19, 1970,
P 20 24 303.2
Int. Cl. B32b 3/10; G03d 15/04
U.S. Cl. 161—102     3 Claims

ABSTRACT OF THE DISCLOSURE

An adhesive splicing element for use in splicing together the ends of two strips (such as tape-recorder tapes) comprises a substantially rectangular pliable tab adhesive coated on one side and having perforations in a row along its centre line; folded strippable handling strips overlie the adhesive layer each to cover a respective half thereof with their folds abutting or confronting one another along the said centre line, each such handling strip being divided, by its fold, into an adherent panel contacting the adhesive and a handling panel extending outwards of the tab from the centre line and overhanging the respective edge of the tab. Such a splicing element lends itself readily to being handled mechanically, the tab being capable of being peeled from the handling strips and applied to the strips to be joined, by means of an applicator.

---

This invention concerns an adhesive splicing element, for use in splicing together the ends of two strips to be joined, arranged in end-to-end adjacent disposition, and also a method of effecting such splicing.

It is already known to splice plastics strips (e.g. recording tapes, which may or may not be perforate, and cinematograph films) by use of a transparent splicing element which is self-adhesive. In the completed spliced joint, the element is, in effect, folded to a U-shaped cross-section, with the joined strip ends disposed end-to-end between the limbs of the U being securely sandwiched therebetween and connected reliably to the element by the adhesive.

The known splicing elements usually embody one or more protective strips for the adhesive layer, which protective strips must, of course, be stripped off before the element can be used for its intended purpose, namely the making of a spliced joint. This stripping of the protective strips and making of the joint is usually effected either wholly or largely manually, although an accessory for accurately severing the ends of the tapes to be joined and holding them still whilst the splicing element is applied, is known. In using this accessory, the splicing element is offered to the strip ends to be joined so that one of its two protective strips faces said ends and overlies each of said ends approximately equally. Thereupon, the said one of the protective strips is peeled off by hand and the splicing element is pressed firmly onto the strip ends to adhere to one side of said strip ends. After this, the joined tapes have to be taken from the accessory, turned over, and replaced therein, whilst part of the splicing element still covered by the remaining protective strip, projects laterally from the joined strips. The remaining protective strip can then be peeled off and the projecting part of the splicing element can then be folded over to overlie the strip ends being joined and pressed tightly thereagainst, all by hand.

As hitherto carried out, therefore, the joining of strips by splicing has been comparatively complicated. It requires very precise manipulation of the various components being handled, involving substantial manual and intellectual dexterity.

An object of this invention is to simplify the procedures involved and to provide for the stripping of the protective or handling strips of the splicing element, and the application of such element to the strip ends to be joined, to be effected mechanically.

With this object in view, the present invention provides, as a first feature, an adhesive splicing element, for use in splicing together the ends of two strips to be joined arranged in end-to-end adjacent disposition, comprising a pliable substantially rectangular tab having a plurality of perforations spaced along a centre line thereof, a layer of contact-adhesive overlying one face of said tab, and a pair of detachable handling strips adhered to said adhesive layer so as to be readily strippable therefrom, each said handling strip overlying a respective half of said tab up to said centre line and being folded in register with said centre line to provide an adherent panel in contact with said adhesive on the respective half of said tab up to said centre line, and a handling panel which overlies the respective adherent panel and extends outwards from said centre line and projects past the respective edge, parallel to said centre line, of the respective half of said tab.

Pursuant thereto, the invention further provides a method of splicing together the ends of two strips to be joined, arranged in end-to-end adjacent disposition, using such a splicing element, which comprises:

(a) holding said element stationary by means of its said handling panels;
(b) stripping the tab of said element from its said handling strips by engaging said tab, along its centre line from the side of said tab remote from said handling strips, with a toothed applicator whose teeth engage in said perforations of said tab, and displacing said applicator substantially perpendicularly to the plane of said tab which said handling panels are still held, so that said handling strips are peeled from said tab;
(c) applying one half of said tab, up to said centre line, by its adhesive layer to one face of said adjacent ends of said strips to be joined, so as to become adhered thereto, whilst said tab is still retained by said applicator; and
(d) folding said tab so that its other said half is applied to and becomes adhered to the other face of said adjacent ends of said strips to be joined.

The method of the invention enables the tab to be stripped from its handling strips and applied to the strip ends to be joined, entirely mechanically and with no manual handling of the splicing element or the strips to be joined.

The invention will be described further, by way of example, with reference to the accompanying drawings, in which:

FIG. 1 is a diagrammatic perspective view showing two strip ends which have been joined by splicing in accordance with the invention;

FIG. 2 is a cross-section taken on the line II—II of FIG. 1;

FIG. 3 is a diagrammatic end elevation of a splicing element conforming to the invention, said element being shown in its complete and unused form;

FIG. 4 is a plan view of the splicing element of FIG. 3;

FIG. 5 is a diagrammatic end elevation, to a reduced scale as compared with FIG. 3, showing how an applicator can be used mechanically to strip the handling layers from the splicing element of FIGS. 3 and 4;

FIG. 6 is a view comparable to FIG. 5, but showing how the applicator can then used to apply the tab of the splicing element of FIGS. 3, 4 and 5 to strip ends to be joined;

FIG. 7 illustrates diagrammatically the assembly consisting of the strip ends with tab adhering to and connecting them, as obtained in accordance with FIG. 6, and indicates also how the tab should be subsequently folded to complete the splicing; and FIG. 8 is a view comparable with FIGS. 5, 6 and 7 illustrating the completed spliced joint which is similar to that of FIG. 2.

Referring firstly to FIGS. 1 and 2 of the drawings, these figures show the ends of two strips 1 and 2 of plastic material (which may be recording tapes or cinematograph films) each of which has a respective row of perforations 3 and 4 adjacent one edge thereof, appropriately joined together (or spliced) in end-to-end adjacent relative disposition by means of an adhesive tab 5. As can be seen, this tab 5 is folded to a U-shaped configuration and the strip ends 1, 2 are accommodated between the limbs 6, 7 of such U. The faces of such limbs 6, 7 confronting the strips 1, 2 are coated with a layer of contact adhesive or pressure-sensitive adhesive, and upon the limbs 6, 7 being pressed firmly towards one another they adhere firmly to the strip ends and form a secure spliced joint thereon.

From FIG. 1 it will be appreciated that the tab 5, in its folded condition, has a plurality of recesses 14 along one edge thereof, each said recess 14 registering with a respective one of the perforations 3 or 4 in the strip 1 or 2.

FIGS. 3 and 4 illustrate the form of an entire splicing element suitable for use in forming the spliced joint of FIG. 1. The tab 5, in its flat condition, is substantially rectangular in shape and is formed along its centre line with apertures 14 which, when the tab 5 is folded as in FIGS. 1 and 2, provide the recesses 14 shown in the latter figures. One face only of the tab 5 is coated with the contact adhesive and to enable the element to be handled readily the adhesive coating or layer is covered by a pair of detachable paper handling strips 8 and 9 which are readily strippable therefrom being coated or impregnated with a release agent, and each of which overlies a respective half of the tab 5 up to the centre line thereof. Each such strip 8, 9 is folded, respectively at 11, 10 (FIG. 3) to define a respective adherent panel 13, 12 which overlies the respectively half of the tab 5 up to its centre line, the folds 11, 10 abutting or confronting one another substantially in register with the centre line of the tab. The remainder of each handling strip 8, 9 constitutes a handling panel which overlies the respective adherent panel 13, 12 and extends from the respective fold 11, 10 at the centre line of the tab 5 outwards past the respective edge of the respective half of the tab 5.

As can be seen from FIG. 4, each such handling panel has therethrough a respective aperture 15, 16, with the aperture 15 in the one handling panel of a different shape or configuration from that of the aperture 16 in the other of said panels. These apertures 15, 16 serve to enable the entire splicing element to be held by means of the handling panels, as will now be described with reference to FIGS. 5 to 8. The handling panel in which the aperture 16 is disposed is provided also with recesses 19 and 20 in two opposite edges thereof, and these, together with such aperture enable such handling panel to be located reliably on a peg 18 of a splicing element holder which is illustrated only diagrammatically in FIG. 5 and comprises the peg 18 and a further peg 17 on which locates the handling panel having the aperture 15 therein. The cross-sections of the pegs 17, 18 correspond to the shapes of the apertures 15, 16 and this ensures that the splicing element is located only in the correct orientation on the pegs 17, 18 of the holder, the edge recesses 19, 20 contributing to such location by engaging with corresponding protrusions (not shown) provided in the holder.

As is evident from FIG. 5, the splicing element is located on the upwardly-projecting pegs 17, 18 with the tab 5 downwardly-disposed and confronting an applicator which is indicated diagrammatically at 23 and registers with the centre line of the tab 5. This applicator 23 comprises a serrated or toothed bar providing teeth (indicated diagrammatically at 24 in FIG. 5) which, upon movement of the applicator upwards as indicated by the arrow A, engage into the apertures 14.

It will be appreciated that upon continued movement of the applicator 23 upwards in the direction of the arrow A, after the teeth 24 have engaged into the apertures 14, the tab 5 is positively displaced upwards so as to increase the distances between the centre line of the tab 5 and the pegs 17, 18. As a result, the handling strips 8, 9 are progressively peeled off the tab 5, bending at the points 21, 22 adjacent the pins, with the adherent panels 13, 12 being rolled back off the adhesive layer on the tab 5 and eventually becoming detached therefrom at the respective edge of the tab 5. The tab 5 is then simply located on the applicator 23, with its adhesive layer upwardly directed, as shown in FIG. 6.

The latter figure shows how the applicator 23 may be arranged for swinging about a pivot axis 25, as indicated by arrow B so as to carry the tab 5 from the position illustrated in full lines to the position shown in broken lines wherein one-half of such tab 5, up to its centre line, is applied to the upper surface of the juxtaposed and aligned ends of the strips 1, 2 to be connected by splicing. The tab 5 accordingly becomes firmly adhered to the upper surfaces of such strip ends, and the assembly indicated in FIG. 7 is achieved. The remaining non-adherent part of the tab 5 protruding from the strips 1, 2 is folded about the edge of the latter, as has been indicated diagrammatically by the arrow in FIG. 7, to bring such part of the tab 5 against the underside of the strips 1, 2 against which it is pressed firmly to assure secure adhesion of the entire tab 5 to the strips 1, 2 to form the completed spliced joint as shown in FIG. 8 and corresponding to FIGS. 1 and 2, with the recesses formed by the apertures 14 registered with the perforations 3, 4.

It will be appreciated, from the foregoing description, that the splicing element of the invention, and the splicing method based thereon makes it possible largely to automate or machanise the splicing of the ends of a pair of strips to be jointed, splicing being effected by locating the strips and the splicing element in the holder and then moving the applicator, as indicated in FIGS. 5 and 6, to cause the handling strips 8, 9 to be stripped from the tab 5 and then carry such tab 5 into engagement with the ends of the strips 1, 2 to be joined.

I claim:

1. An adhesive splicing element, for use in splicing together the ends of two strips to be joined, arranged in end-to-end adjacent disposition, comprising a pliable substantially rectangular tab having a plurality of perforations spaced along a centre line thereof, a layer of contact-adhesive overlying one face of said tab, and a pair of detachable handling strips adhered to said adhesive layer so as to be readily strippable therefrom, each said handling strip overlying a respective half of said tab up to said centre line and being folded in register with said centre line to provide an adherent panel in contact with said adhesive on the respective half of said tab up to said centre line, and a handling panel which overlies the respective adherent panel and extends outwards from said centre line and projects past the respective edge, parallel to said centre line, of the respective half of said tab, a respective aperture being provided in each said handling panel for enabling said element to be properly and tightly located on the pins of a splicing element holder for a splicing operation in which the recesses and pins form a clamping seat for the handling panels.

2. An adhesive splicing element as set forth in claim 1, wherein the apertures in said handling panels are of differing configuration.

3. An adhesive splicing element as set forth in claim 1, wherein one of said handling panels has at least one edge recess therein.

References Cited

UNITED STATES PATENTS

| | | | |
|---|---|---|---|
| 3,424,644 | 1/1969 | Nakagome | 161—113 X |
| 3,475,263 | 10/1969 | Kapilow et al. | 161—406 X |
| 2,424,508 | 7/1947 | Simmons | 161—406 X |
| 3,677,866 | 7/1972 | Pickett | 161—406 X |
| 3,053,711 | 9/1962 | Eagle et al. | 156—502 |
| 2,994,362 | 8/1961 | Hall | 161—406 X |
| 2,969,106 | 1/1961 | Reibel et al. | 161—406 X |

RALPH S. KENDALL, Primary Examiner

U.S. Cl. X.R.

161—113, 406